US008629341B2

(12) United States Patent
Murphy (10) Patent No.: US 8,629,341 B2
(45) Date of Patent: Jan. 14, 2014

(54) METHOD OF IMPROVING VOCAL PERFORMANCE WITH EMBOUCHURE FUNCTIONS

(76) Inventor: Amy T Murphy, Mountain Brook, AL (US)

(*) Notice: Subject to any disclaimer, the term of this patent is extended or adjusted under 35 U.S.C. 154(b) by 0 days.

(21) Appl. No.: 13/281,262

(22) Filed: Oct. 25, 2011

(65) Prior Publication Data

US 2013/0098225 A1    Apr. 25, 2013

(51) Int. Cl.
*G09B 15/00*    (2006.01)
(52) U.S. Cl.
USPC ..................................... 84/470 R; 84/483.2
(58) Field of Classification Search
USPC ................... 84/470 R, 483 R, 307, 308
See application file for complete search history.

(56) References Cited

U.S. PATENT DOCUMENTS

| | | | | |
|---|---|---|---|---|
| 660,255 A * | 10/1900 | Kingma | ........................ | 434/185 |
| 3,293,976 A * | 12/1966 | Windows, Jr. | .................. | 84/453 |
| 3,407,515 A * | 10/1968 | Pitman | .......................... | 434/185 |
| 3,426,451 A * | 2/1969 | Hoffmann | ..................... | 434/178 |
| 4,030,211 A * | 6/1977 | McGinley | ..................... | 434/167 |
| 4,193,212 A * | 3/1980 | Al-Kufaishi | ................. | 434/178 |
| 4,650,423 A * | 3/1987 | Sprague et al. | ............... | 434/156 |
| 4,768,959 A * | 9/1988 | Sprague et al. | ............... | 434/156 |
| 4,795,349 A * | 1/1989 | Sprague et al. | ............... | 434/156 |
| 5,197,883 A * | 3/1993 | Johnston | ....................... | 434/167 |
| 5,429,513 A * | 7/1995 | Diaz-Plaza | .................. | 434/167 |
| 6,015,947 A | 1/2000 | Moberg | | |
| 6,546,229 B1 * | 4/2003 | Love et al. | .................... | 434/308 |
| 6,639,139 B2 | 10/2003 | Muller | | |
| 7,110,946 B2 * | 9/2006 | Belenger et al. | .............. | 704/235 |
| 7,292,971 B2 * | 11/2007 | Su | .................................... | 704/5 |
| 7,897,862 B2 | 3/2011 | Tashima | | |
| 2002/0096037 A1 * | 7/2002 | Muller | ......................... | 84/483.1 |
| 2005/0112532 A1 * | 5/2005 | Su | ................................. | 434/167 |
| 2007/0044638 A1 | 3/2007 | Egan | | |
| 2013/0098225 A1 * | 4/2013 | Murphy | ..................... | 84/470 R |

* cited by examiner

*Primary Examiner* — Robert W Horn
(74) *Attorney, Agent, or Firm* — Paul M. Sykes; Bradley Arant Boult Cummings LLP (57) ABSTRACT

A system and method for defining proper embouchure mechanics for vocalization and for representing those mechanics symbolically, such that proper embouchure for vocalization can be taught consistently and can be included in written music, to be read and executed by a vocalist in real time while performing a piece of music.

16 Claims, 9 Drawing Sheets

America, the Beautiful

METHOD OF IMPROVING VOCAL PERFORMANCE WITH EMBOUCHURE FUNCTIONS

TECHNICAL FIELD

The invention relates generally a method of instructing proper embouchure mechanics for vocal performance.

BACKGROUND

Historically, there seems to have been as many ways to teach singing as there are singing instructors. All too often the teaching methods are subjective, differ from one student to the next, and focus on finer points of technique before the fundamentals of proper vocalization are established in the student. Consequently, achieving good results has been hit or miss, such that some students appear to innately have what it takes to sing properly and others do not.

Figures 1A, 1B:
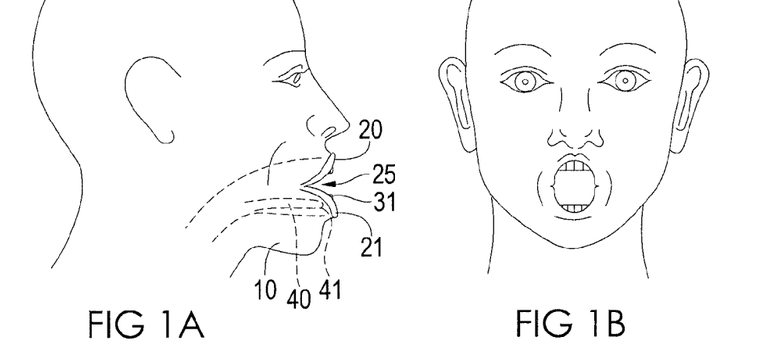
FIGS. 1A-B are front and profile views of a vocalist showing the embouchure mechanics of the < OH lip trumpet function.
Figures 2A, 2B:
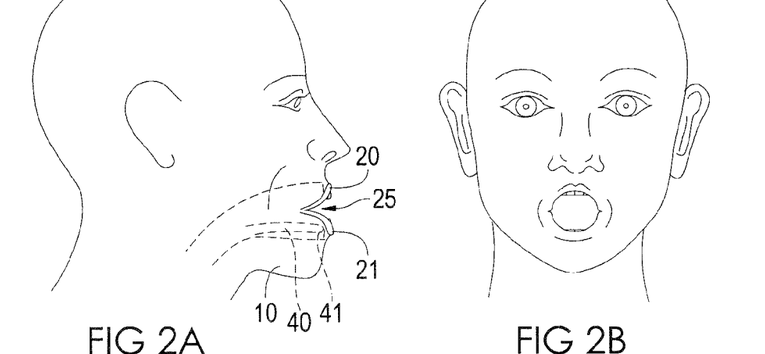
FIGS. 2A-B are front and profile views of a vocalist showing the embouchure mechanics of the < UH lip trumpet function.
Figures 3A, 3B:
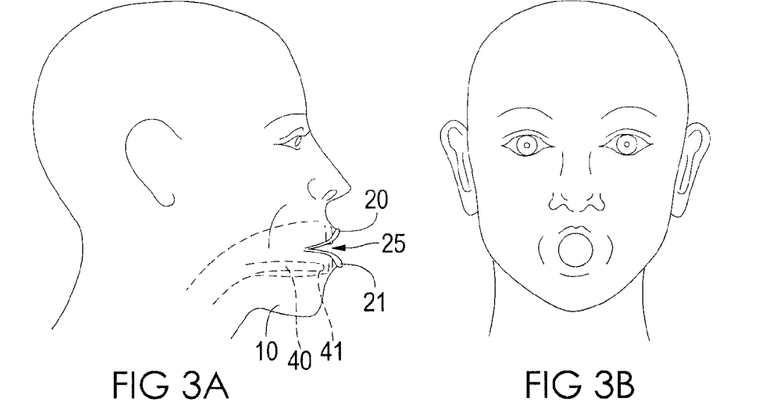
FIGS. 3A-B are front and profile views of a vocalist showing the embouchure mechanics of the oo lip trumpet function.

Singing begins with proper embouchure mechanics. With respect to this disclosure, embouchure is defined as the positioning and movement of the tongue, mouth, lips (including musculature of the face around the lips back to the "smile lines," as shown in FIGS. 1-3), and the teeth or jaw, for vocalization. Embouchure affects the fullness, volume, roundness, richness, and projection of a singer's voice. Proper embouchure mechanics position and shape the lips, mouth, jaw and concomitantly the teeth, the oral cavity, and the column from the back of the mouth to the larynx to optimize the sound and delivery of the voice.

Embouchure is distinct from phonetics. Phonetics generally relates to particular speech sounds and their reproduction. A person may enunciate a particular phonetic sound and be readily understood with or without proper embouchure of the mouth. The traditional means of representing phonetics do not represent or instruct proper embouchure of the mouth, especially proper embouchure for singing. In fact, a singer may reproduce a given phoneme perfectly from a linguistic perspective but still be singing far below her natural capabilities, because she is not using proper embouchure to optimize her vocal instrument.

While the importance of proper embouchure has been recognized, there has not been an effort to identify, classify, and represent proper embouchure mechanics such that it may be taught in a systematic manner to achieve consistent and repeatable results. Likewise, there is no system for visually representing proper embouchure mechanics such that a singer can read the proper embouchure for a given word or sound, just as a guitar player can read finger charts and know the proper finger positioning on the fret board for a given chord.

Thus, there is a need for a system and method for defining proper embouchure mechanics for vocalization and for representing those mechanics symbolically, such that proper embouchure can be taught consistently and can be read and executed by a vocalist in real time while performing a piece of music.

SUMMARY

Embodiments of the present invention satisfy these needs. One embodiment of the present invention is a method of teaching vocal performance, comprising defining a plurality of functions of embouchure mechanics for vocalization and representing each said function symbolically. The symbols may be any symbol capable of sensory perception, including graphical symbols or hand gestures. The primary embouchure functions include a lip trumpet, an L function, a K function, and a G function. The lip trumpet may be further broken down into an < OH function, an < UH function, and an oo function. In addition, a fifth function, the NG function, may also be included. Each of these embouchure functions correspond to specific positioning and, in some cases movement (or the lack of movement), of the tongue, mouth, lips and associated musculature, and the teeth or jaw. The embouchure functions having been defined and represented symbolically, phonetic sounds may be classified by embouchure function and associated with the symbol for the corresponding embouchure function. Next, in a further embodiment, one may identify the embouchure function corresponding to each sound of a vocal in a musical work represented in a visual medium of expression, such as sheet music or as depicted on a graphical user interface, and label each said sound with the corresponding embouchure symbol. Preferably, the musical work is represented in metered time, and the embouchure symbols for the vocal are also provided in metered time. In still further embodiments, embouchure functions for tongue vowels, including EE, IH, EH, and AH, are defined and represented symbolically. Embouchure rules may be defined and represented symbolically for additional phonemes. Embouchure rules include combinations of embouchure functions, MPB, VF, S, Z, and < UH R+.

Another embodiment of the present invention comprises instructing a vocalist in proper embouchure by providing in a written piece of music (or other fixed medium of expression) symbols for embouchure mechanics for the vocal of the musical work. Still further embodiments of the present invention are various articles of manufacture, including sheet music, computer memories comprising software, and video recordings including symbolic representations of embouchure mechanics.

BRIEF DESCRIPTION OF THE DRAWINGS

The present invention will be explained, by way of example only, with reference to certain embodiments and the attached Figures, in which.

DETAILED DESCRIPTION

One embodiment of the method of the present invention comprises defining specific embouchure mechanics for vocalization of certain sounds, referred to as embouchure functions, and representing those functions symbolically. Once the functions are defined and represented symbolically, phonetic sounds can be classified by embouchure function and assigned the corresponding embouchure symbol. Another embodiment of the present invention is application of the foregoing system of embouchure functions to a vocal in a written piece of music. Using embouchure symbols, embouchure functions for each sound in the vocal are labeled, preferably in metered time, such that the vocalist can literally read the proper embouchure required to best perform the vocal. These and other embodiments of the present invention will be discussed in greater detail below. It should be understood that while singing is the primary and exemplary application discussed herein, embodiments of the present invention are applicable to other activities in which proper vocalization is important, including speech therapy, straight dramatic theater, public speaking, and correcting vocalization in deaf persons and formerly deaf persons who have cochlear implants.

According to one embodiment, four distinct combinations of embouchure mechanics are identified and defined as primary embouchure functions. These four functions have been assigned particular names, symbols, and in some embodiments colors, but it should be understood that such names, symbols, and colors are exemplary only and any name, symbol, or color that might be desired to represent these functions may be chosen and is within the scope of the present invention. These four embouchure functions are the lip trumpet, the L function, the K function, and the G function.

Figure 7:
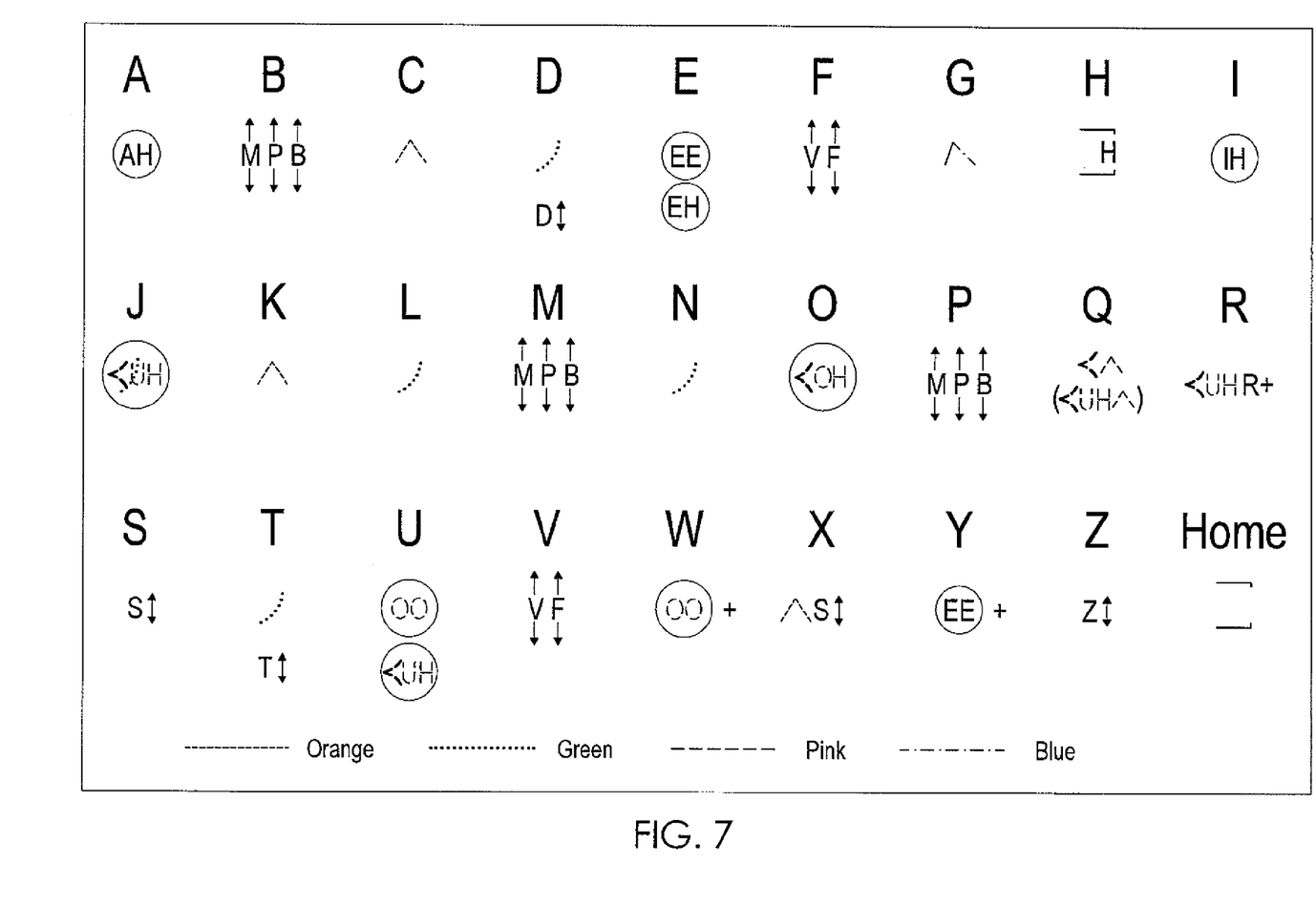
FIG. 7 illustrates the symbols for the embouchure functions and rules corresponding to the letters of the English alphabet.
Figure 9:
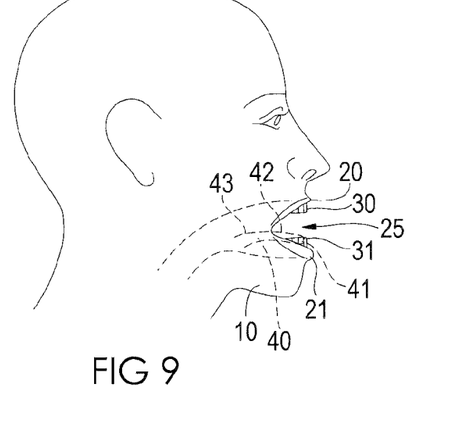
FIG. 9 is a profile view of a vocalist in depicting the embouchure mechanics of the AH function, which also are the embouchure mechanics of the home position.

Before providing the details of the particular embouchure functions, the starting position from which the embouchure functions are executed will be presented. This position will be referred to as the home position, and is shown in FIG. 9. The jaw 10 is dropped with the lips 20, 21 open and relaxed, such that the width of the opening 25 between the upper and lower teeth 30, 31 is two fingers wide. (Unless otherwise specified herein, a reference to the teeth is to the front teeth, i.e., the incisors and canines.) Typically, in practice, a student will open her mouth and insert the index and middle fingers, stacked upon one another, between and in contact with the upper and lower teeth, to set and learn the dimensions of the proper opening. With the mouth so opened, the tip 41 of the tongue 40 is placed lightly against the enamel of the back of the lower teeth 31, with the middle 42 (or blade) of the tongue 40 and the back 43 of the tongue flat, down, and relaxed against the bottom 50 of the mouth. This positioning opens and rounds the oral cavity and the column between the back of the mouth and the larynx. The tongue is placed out of the way so that it does not obstruct the flow of sound. The vocal instrument is thus prepared to make a full and round sound. With the mouth open two fingers wide, tongue down and throat rounded, the vocalist fixes her mouth in this position ("freezes" the lips, jaw, and tongue), breathes deeply to fill the lungs with air and is ready to sing. A shorthand instruction for this sequence is "freeze-breathe" or FB. As shown in FIG. 7, the home position is represented symbolically by two horizontally opposed lines, with a small vertical serif on the right hand side (to represent the teeth), with a space in between. Unless otherwise instructed, the home position is the default position to which a vocalist returns after execution of an embouchure function.

The lip trumpet function, as shown in FIGS. 1A-B, is so named because of the distinctive position of the lips in the embouchure. Beginning in the home position, the opening 25 of the mouth remains opened to two fingers wide with the tip 41 of the tongue 40 flush against the back of the lower teeth 31. The lips 20, 21 purse forward into a pucker, forming a shape akin to the bell of a trumpet. This embouchure function is used to make the < OH vowel sound. As shown in FIG. 7, the exemplary symbol for the lip trumpet is < and resembles the actual shape of the mouth in profile for this embouchure function.

The lip trumpet may be further classified into three subsidiary functions, each representing a varying degree of constriction of the lips and consequent narrowing of the mouth opening. The first is the most open lip trumpet described above for the < OH sound. Relative to the first lip trumpet, the second lip trumpet is formed with the lips 20, 21 more constricted and pursed slightly more forward with the mouth still retaining a generally oval opening, as shown in FIGS. 2A-B. This embouchure function is used for making the UH vowel sound, and the symbol may be written as < UH or simply a narrower <. For the third lip trumpet, the lips 20, 21 are constricted and pursed approximately into a round O shape, with the lips projecting forward, as shown in FIGS. 3A-B. Despite the narrowing of the mouth opening in this position, the jaw 10 should not move and the position of the teeth should remain unchanged from the home position, that is, preferably two fingers apart. The exemplary symbol for the third lip trumpet is oo, representing the shape of the mouth and sound made when using this function. In a preferred embodiment, each of the symbols for the lip trumpet is depicted in the color pink.

Figure 4:
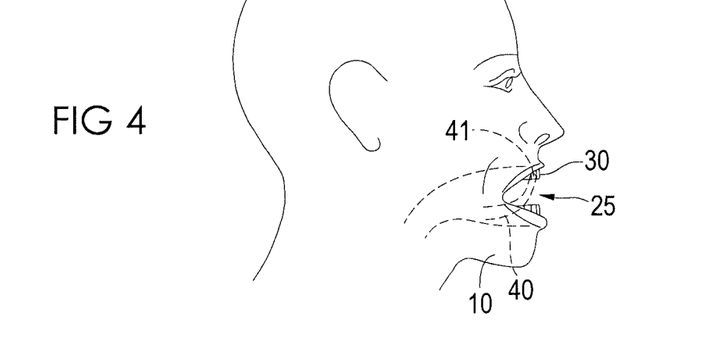
FIG. 4 is a profile view of a vocalist showing the embouchure mechanics of the L function.

The next primary function is the L function, shown in FIG. 4. The L function is so named because it represents the embouchure for properly making the L sound in the English language, as well as a number of other sounds, discussed below. For the L function, starting with the embouchure in the home position, the tongue 40 is bowed with the tip 41 of the tongue 40 lifted to meet the back of the top teeth 30. From this position, the tongue may be released to execute one of the sounds corresponding to the L function. Although the tongue 40 moves during execution, the jaw 10 should remain stationary such that a two-finger opening 25 remains between the teeth to allow and open and round passageway through which sound may travel. The exemplary symbol for the L function is ⌡, as shown on FIG. 7 beneath the L, and in a preferred embodiment, is depicted in the color green.

Figure 5:
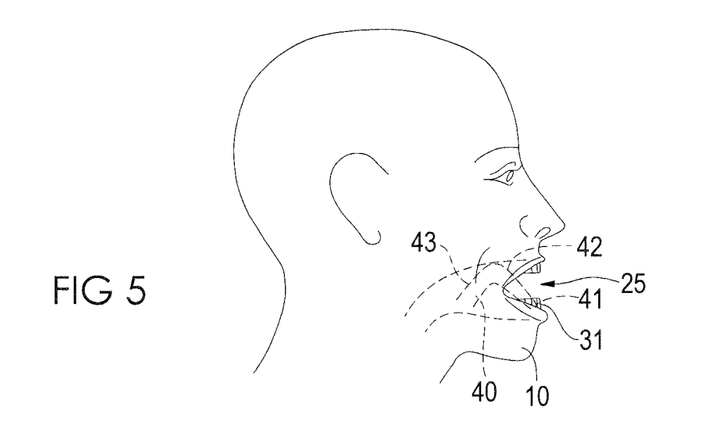
FIG. 5 is a profile view of a vocalist showing the embouchure mechanics of the K function.

The third primary embouchure function is the K function, shown in FIG. 5. The K function is so named because it represents the embouchure for properly making, among others, the K sound in the English language. For the K function, starting with the embouchure in the home position, including with the tip 41 of the tongue 40 flush against the lower teeth 31. The blade 42 of the tongue is raised, creating a rounded peak in the middle of the mouth, with the tongue sloping downward both towards the teeth and towards the rear of the mouth. The blade 43 of the tongue is then released into a flat position to execute one of the many sounds corresponding to the K function. As with the L function, the jaw is uninvolved and the teeth should remain apart the width of two fingers. The exemplary symbol for the K function is ∧ as shown beneath the K in FIG. 7, and in a preferred embodiment, is depicted in the color orange.

Figure 6:
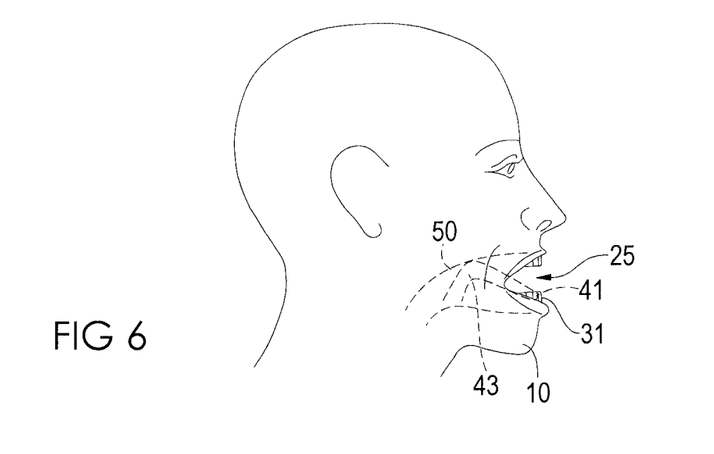
FIG. 6 is a profile view of a vocalist showing the embouchure mechanics of the G function.

The fourth primary function is the G function, shown in FIG. 6. The G function is so named because it represents the embouchure for properly making, among others, the G sound in the English language. For the G function, starting with the embouchure in the home position, including with the tip 41 of the tongue 40 flush against the back of the lower teeth 31. The back 43 of the tongue 40 is raised into contact with the back of the hard palate 50, near the rear molars, creating a rounded peak in the back of the mouth, with the tongue 40 sloping like a slide downward both towards the lower front teeth 31 and more steeply downward behind the back 43 of the tongue 40 towards the throat. The back 43 of the tongue 40 is then released into a flat position to execute one of the many sounds corresponding to the G function. As with the previous functions, the jaw 10 is uninvolved and the teeth 30, 31 should remain apart the width of two fingers, as shown by opening 25. The exemplary symbol for the G function is ∧ as shown beneath the G in FIG. 7, and in a preferred embodiment, is depicted in the color blue.

In addition to the foregoing primary embouchure functions, there is a fifth function, subsidiary to the G function, which is essentially half of the G function. This function is called the NG function, because it represents the embouchure for properly singing, among others, the NG sound in the English language. The NG function is the same as the G function, except that the back 43 of the tongue 40 is not released in executing the sounds corresponding to the NG function. Instead, the back 43 of the tongue 40 remains upward near the back of the hard palate 50 during execution of the sound, and upon completion, the tongue is relaxed and placed into the home position. The exemplary symbol for the NG function is ╲ and in a preferred embodiment, may be depicted in the color blue.

With the primary embouchure functions having been defined and represented symbolically, the next step in the method of one embodiment of the present invention is to classify the sounds represented by the alphabet according to embouchure function and assign the corresponding embouchure symbol to each letter. As illustrated in FIG. 7, the primary embouchure functions are used to sing the sounds corresponding to a number of letters of the alphabet. The distinction between phonetics and embouchure is apparent here. While L, N, and final and intervocalic D and T represent phonetically distinct sounds, according to one embodiment of the present invention, each is associated with the same embouchure function, namely the L function, except where final D and final T are involved in a consonant cluster.

Additional embouchure functions and rules are defined for the remaining alphabet letters. First, while the variants of the lip trumpet corresponds to the vowel sounds for ō (oh), u (oo and UH), several vowel sounds correspond to embouchure mechanics in which the tongue is involved. These are referred to as the tongue vowels, and include ē (EE, as in "even"), ĭ (IH, as in "if"), and ĕ (EH, as in "effort").

Figure 8A:
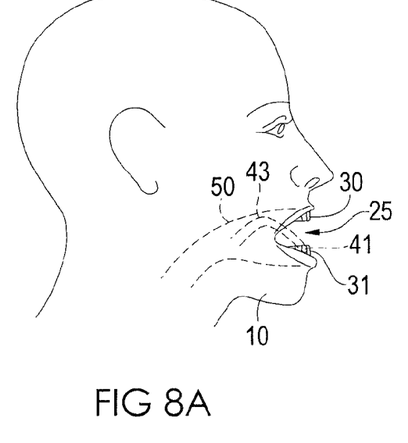
FIGS. 8A-C are profile views of a vocalist showing the embouchure mechanics of each of the tongue vowels, with FIG. 8A depicting the EE function, FIG. 8B depicting the IH function, FIG. 8C depicting the EH function.
Figure 8B:
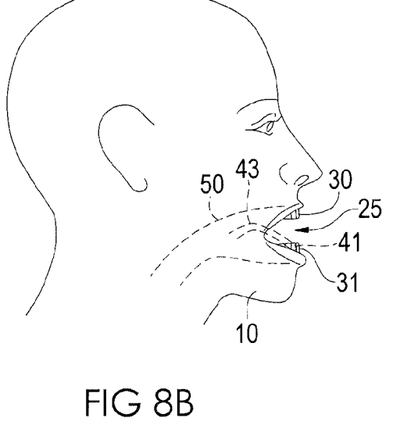
Figure 8C:
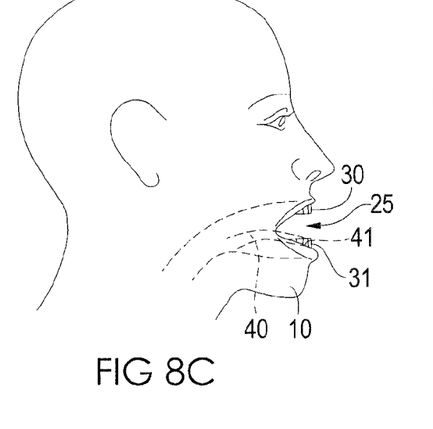

FIGS. 8A-C illustrate the tongue vowels. As shown in FIG. 8A, for the EE vowel, starting from the home position, with the tip 41 of the tongue 40 against the back of the lower teeth 31, the back 43 of the tongue 40 is lifted from the bottom of the mouth almost to, but not into contact with, the palate 50. The tongue 40 is more relaxed and also lower than its position in the G or NG function. The tongue 40 is held in this position through the duration of the EE sound, and the jaw 10 is uninvolved such that the opening 25 between the teeth remains two fingers wide. The symbol for the EE vowel is EE. As shown in FIG. 8B, for the IH vowel, the tongue 40 is slightly lower than for the EE vowel, but otherwise the embouchure mechanics are the same. The symbol for the IH vowel is IH. As shown in FIG. 8C, for the EH vowel, the tongue 40 is slightly lower than for the EE vowel, lifted just off the bottom of the mouth. Otherwise the embouchure mechanics are the same. The symbol for the EH vowel is EH.

A final vowel function is made with no tongue or lip action. This is the ă sound (AH, as in "father"). As shown in FIG. 9, for the AH vowel, the embouchure mechanics are the same as the home position, with the tip 41 of the tongue 40 against the back of the lower front teeth 31 and tongue 40 resting against the bottom of the mouth. The embouchure remains in the home position during the execution of the AH sound. The symbol for the AH vowel is AH.

Because the jaw 10 is uninvolved in many of the above embouchure functions, a vocalist may readily transition from one to another, moving only the tongue, lips, and associated musculature, thus producing a variety of sounds with the throat and mouth remaining in a rounded and open position for optimum sound creation and transmission. Between sounds, the embouchure may return to the home position, from which the vocalist may readily execute any of the embouchure functions.

In addition to the embouchure functions defined above, in a preferred embodiment, there are several embouchure rules for proper embouchure when executing certain sounds. The rules may be a combination of two embouchure functions, or the rules may be distinct mechanics specific to a given consonant sound or cluster, or a combination of a rule and function. Once the basic rules are defined, embodiments of the present invention allow the representation of a combination of rules or functions to be symbolized, read, and performed.

The embouchure mechanics for the J sound are a combination of the L function and < UH lip trumpet. The embouchure rule for J is represented by the two symbols superimposed on one another, as shown in FIG. 7. The embouchure mechanics for the Q sound are a combination of a < UH lip trumpet and K function. The symbols are written with the lip trumpet preceding the K function, as that is preferable sequence of the mechanics when executing the sound. The Y sound, when sung to begin a word, is typically a combination of an EE vowel transitioning into the next sound of the word. For example, the embouchure mechanics for the singing the Y sound, as in the word. "you", are EE plus the oo lip trumpet. Therefore, the symbol for the Y rule is EE+. When Y ends a word, it is represented by the tongue vowel EE alone. For both the Y and J rules, the teeth remain two fingers apart and the jaw is uninvolved.

The embouchure mechanics for the consonants M, P, and B are classified according to the same rule. Starting in the home position with the mouth open, with the tip of the tongue against the back of the lower front teeth, and teeth two finger widths apart, the lips are brought together without moving the jaw, and the desired consonant sound M, P, or B is made with the lips together or as they are separated, as the case may be, before returning the lips back to the home position. The tongue remains stationary. As shown in FIG. 7, the symbol for the MPB rule are the letters MPB with arrows above and beneath the letters to represent that the space between the teeth in the home position is maintained throughout execution of the MPB rule, with the action of the lips operating around this opening to generate and deliver optimum sound.

The embouchure mechanics for the S and Z rules are quite similar to one another. From the home position, the consonant S is made by bringing the teeth together, with the tip of the tongue behind the lower teeth, and then opening the mouth promptly after making the S sounds. As shown in FIG. 7, the symbol for the S rule is an S with a double-ended vertical arrow (↕) immediately after it to represent embouchure rebounding back to the home position as soon as possible. The embouchure mechanics for the Z rule are similar to the S, with closing of the teeth while the Z sound is made, followed promptly by returning the teeth to the home position. The blade of the tongue is raised slightly while the teeth are together to create the phonetic Z sound. As shown in FIG. 7, the symbol for the Z rule is a Z with a double-ended vertical arrow (↕) immediately after it to represent embouchure rebounding back to the home position as soon as possible.

The embouchure mechanics for the consonants V and F fall under the same embouchure rule. From the home position, the lower lip is brought into contact with the upper teeth. The jaw, however, is uninvolved such that the two-finger opening between the teeth of the home position is maintained. Only the lower lip moves. The lower lip is released, and the embouchure of the lips return to the home position as the V and F sounds are made. As shown in FIG. 7, the symbol for the VF rule is a VF with arrows above and below it, to represent that the space between the teeth in the home position is maintained throughout execution of the VF rule, with the action of the lips operating around this opening to generate and deliver optimum sound.

Both W and R are the function of a combination of embouchure mechanics that vary depending on what sounds precedes or follow them. The rule for W is a oo lip trumpet, transitioning into the embouchure mechanics for the sound following the W. The symbol for the W rule is oo+, to represent the oo lip trumpet transitioning into another embouchure function or rule. The embouchure mechanics for R are a function of the sounds immediately preceding and following it, and therefore will vary with each piece of music. Execution of the R rule begins with the embouchure of the < UH lip trumpet function, transitioning into the R sound itself, and then into the embouchure mechanics of the next sound of the vocal. The symbol for the R rule is < UH R+, to represent the transitional nature of its embouchure mechanics.

Thus, one embodiment of the present invention comprises a system of embouchure functions and rules representing the embouchure mechanics of the English alphabet in symbolic form. A second embodiment of the present invention is the application of this system to written music including a vocal, such that a vocalist can read the embouchure functions and rules in order to sing the words of the vocal with proper embouchure mechanics.

Musical works may be represented in a tangible medium of expression in a variety of ways, most commonly as sheet music but also including as represented on a graphical user interface (whether such interface merely reproduces the traditional musical staff or whether it represents the music in some alternative form), a karaoke display, or a video game. The graphical user interface may be that of a computer, personal digital assistant, smart phone, tablet, or any similar device now existing or to be developed in the future. For those with visual impairments, music may also be expressed tangibly in the form of brail or similar tactile systems. As used herein, the terms sheet music or written music shall refer to and comprise any and all means of representing a musical or vocal work in a tangible medium of expression.

Figure 10A:
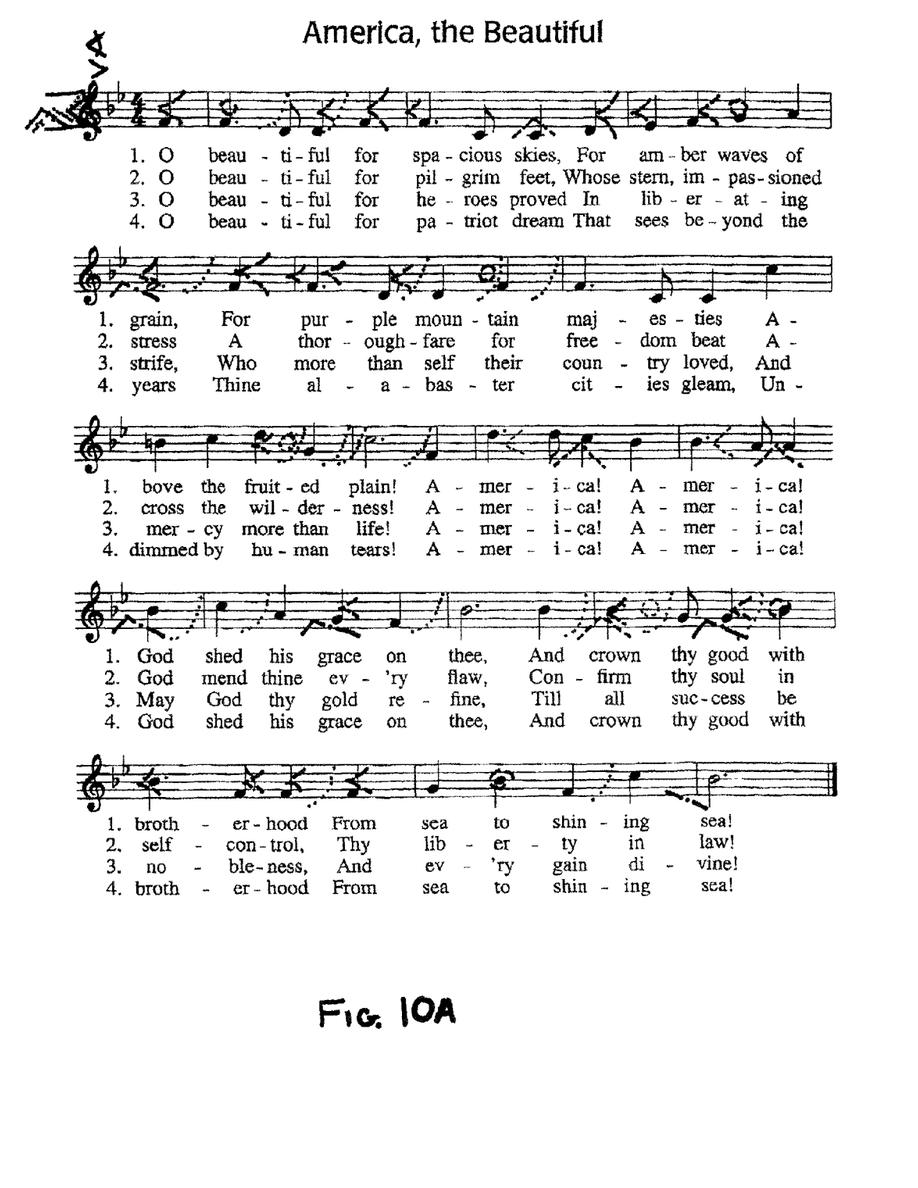
FIGS. 10A-C is an excerpt from an exemplary piece of music in which the vocal has been labeled with the corresponding embouchure functions and rules, in accordance with one embodiment of the present invention.
Figure 10B:
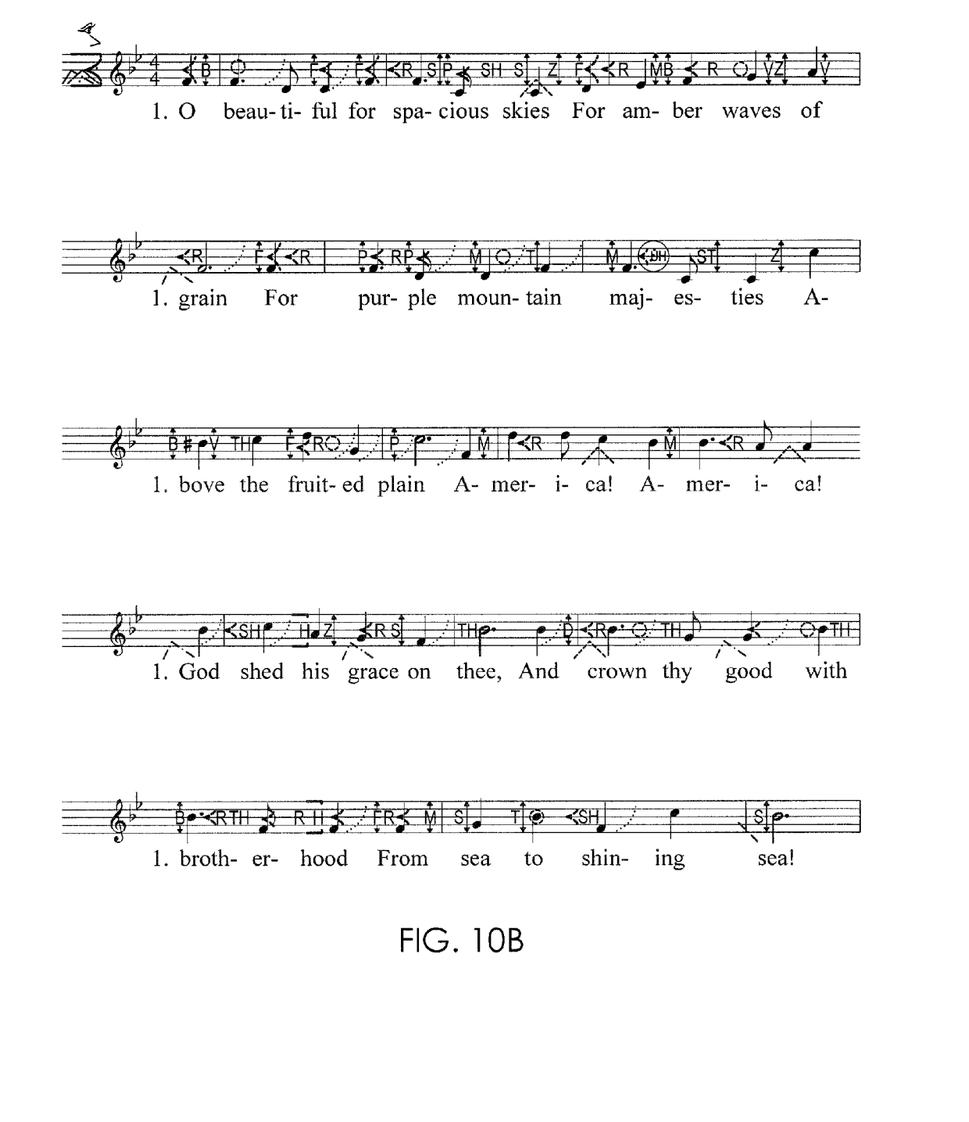
Figure 10C:
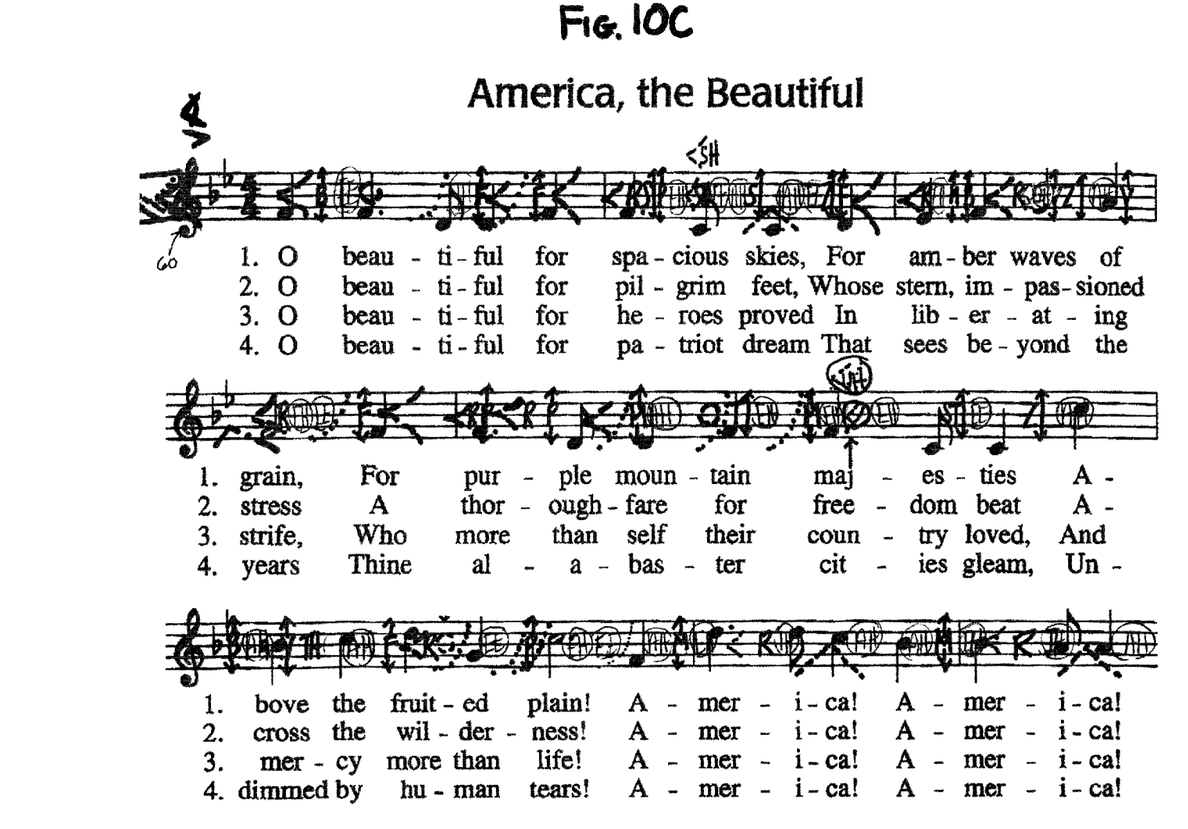

Typically, sheet music for a work including a vocal includes the lyrics beneath the staff containing the musical notes of the work. The notes and lyrics are presented in metered time, according to standard conventions known in the art. To instruct a vocalist on proper embouchure, the embouchure functions for each sound in the piece are labeled directly in the music, preferably in metered time and on the staff itself. In one embodiment, as shown in FIG. 10, a symbol 60 representing the profile of the vocalist is placed onto the clef of the music vocal line, including the symbol for the home position, such that the embouchure is displayed to the vocalist for easy reference. Insertion of the embouchure symbols may be done by hand on an existing piece of sheet music, or the music may be printed with the symbols included. In a preferred embodiment, the embouchure symbols are depicted in distinctive colors to aid the vocalist in readily identifying and performing the corresponding embouchure mechanics.

FIGS. 10A-C are excerpts of an exemplary musical work with the embouchure for the vocals of the first verse marked in metered time with the lyrics in accordance with embodiments of the present invention. In FIG. 10A, the primary embouchure functions (lip trumpets, K function, L function, G function, NG function) are marked. FIG. 10B is the work of FIG. 10A with the addition of the embouchure rules for the consonants. FIG. 10C is the work of FIG. 10A with the addition of the both the embouchure rules for consonants and the vowels.

Figure 11A:
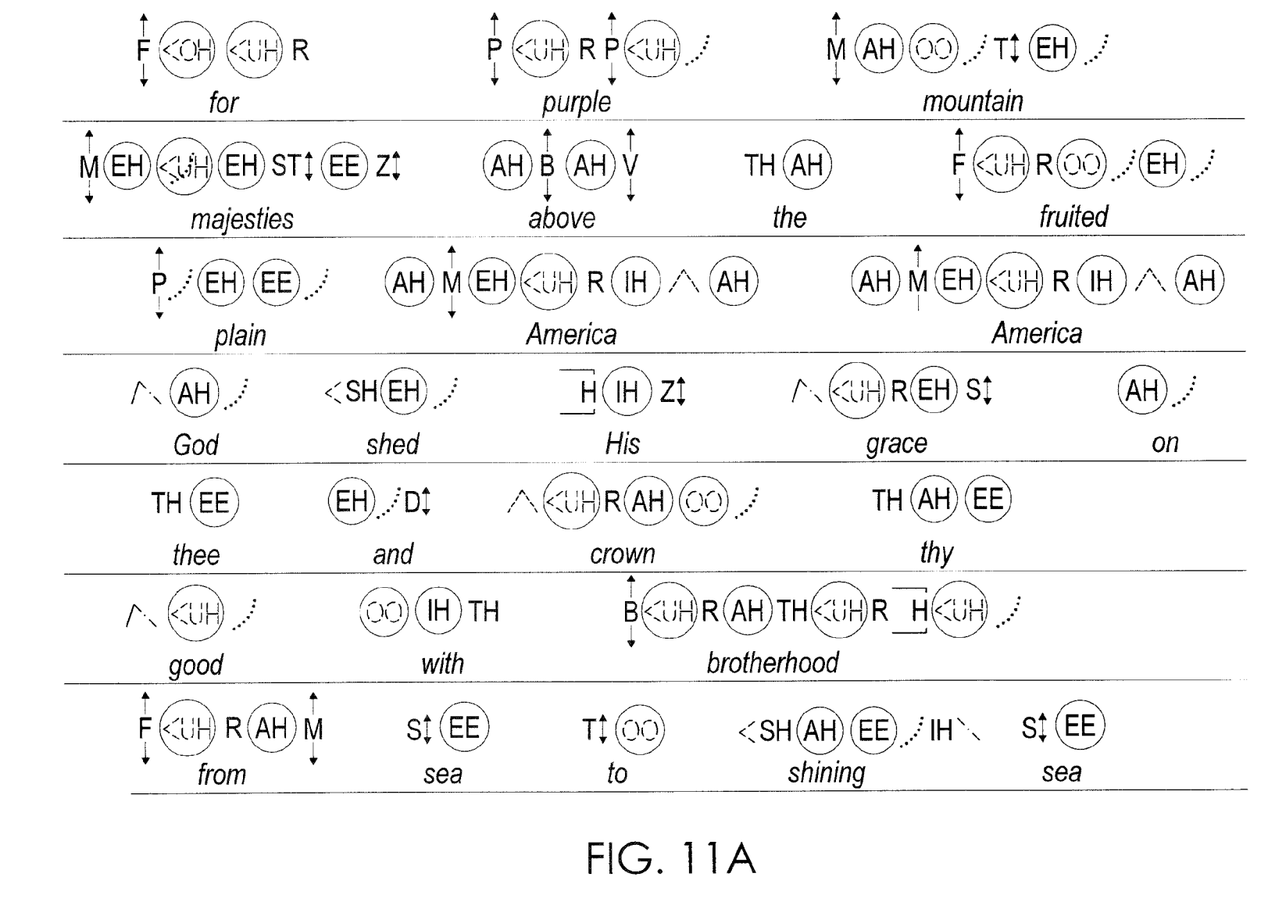
FIGS. 11A-B show the embouchure functions and rules of the exemplary piece of music of FIG. 10, but without the musical staff, and with (FIG. 11A) and without (FIG. 11B) the lyrics.
Figure 11B:
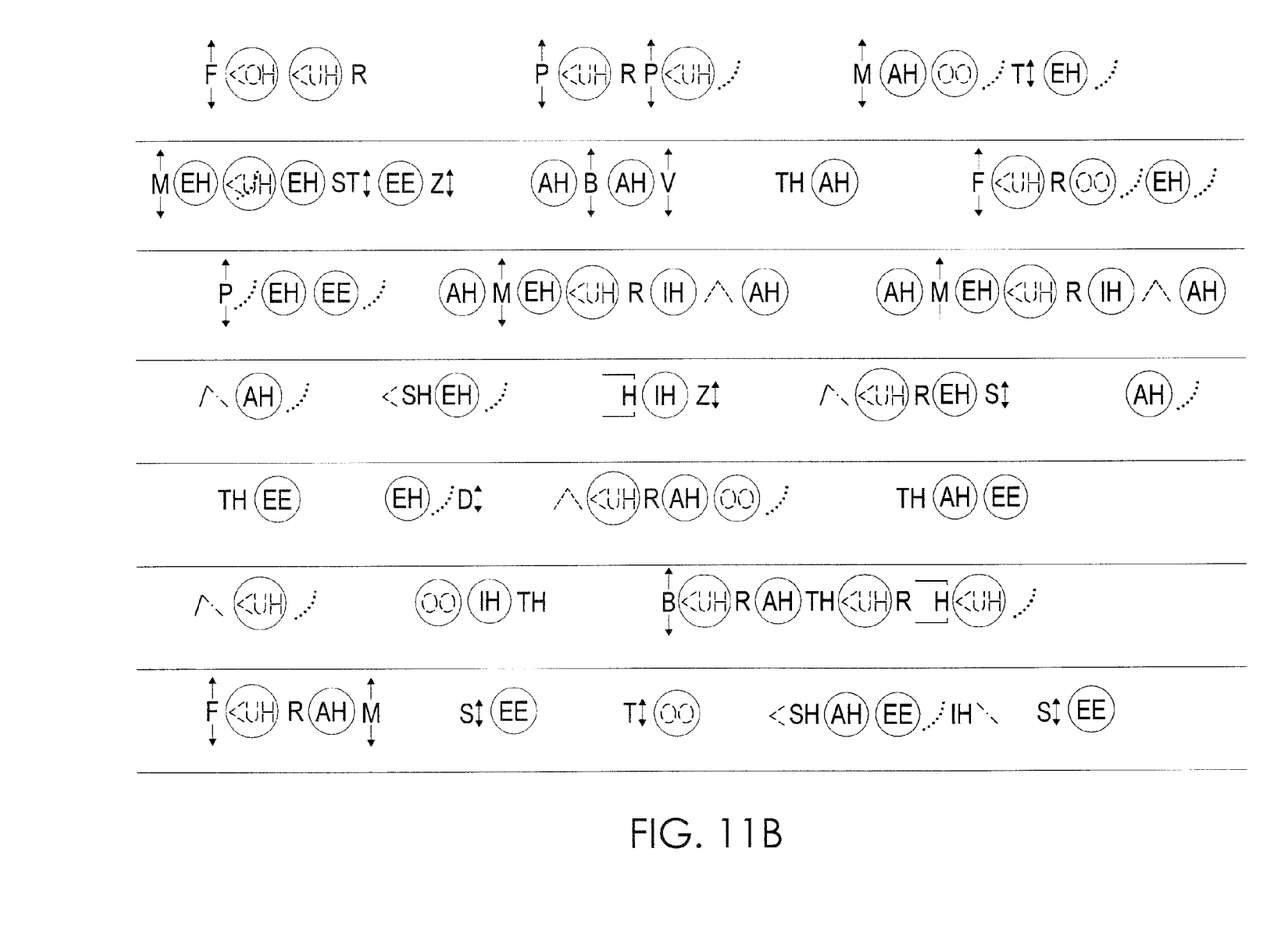

FIG. 11A depict the embouchure functions and rules of the music work of FIGS. 10A-C but without the musical staff or other representation of metered time. In FIG. 11A, the embouchure symbols are shown with the lyrics. In FIG. 11B, the embouchure symbols are shown without the lyrics.

With the proper embouchure represented symbolically in accordance with the teachings of the present invention, a vocalist can sight read an unfamiliar work using this system and execute it with her optimum sound the first time. As a teaching tool, a vocalist can practice a work and know what the proper embouchure mechanics should be, without the presence of her instructor. In addition, the method of the present invention can be applied and taught systematically, to provide consistent instruction and uniform, positive results for singers of all ages and abilities.

Other embodiments of the present invention comprise articles of manufacture containing written musical works having a vocal, in which the embouchure symbols for the vocal are labeled in the music or otherwise visually represented. Such articles may include printed texts such as sheet music (as shown in FIGS. 10A-C), booklets, or text books, and a recordation of a music lesson in which such system is presented, either graphically or by hand gestures, where such recordation is stored in on a video tape, disc, hard drive, or other computer memory. The methods of the present invention may be embodied in the form of karaoke or a video game in which the embouchure symbols corresponding to the vocal are displayed to the player in a dynamic fashion moments before the words are to be sung, to provide real time instruction and require real time execution of the work.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

I claim:

1. A teaching aid for instructing a singer the proper embouchure mechanics of the singer's tongue, lips, jaw, and musculature of the mouth for singing a vocal in a musical work comprising:

a substrate marked with indicia of the sounds of said vocal;
a symbol of an embouchure home position specifying a starting position of the tongue, lips, and jaw; and symbols of embouchure functions specifying movement of at least one of the tongue, lips, jaw, and musculature of the mouth from said home position for singing a particular sound, wherein said sound indicia, said home position symbol, and said embouchure function symbols are arranged in at least one line across said substrate with said home position symbol positioned near the beginning of said line and with said embouchure function symbols positioned relative to said sound indicia to instruct movement of at least one of the tongue, lips, jaw, and musculature of the mouth from said home position in time with said sound indicia for singing said sounds.

2. The teaching aid of claim 1, wherein said home position symbol defines embouchure mechanics comprising the jaw being opened and fixed with the teeth a predetermined width apart, the tongue flat across the bottom of the mouth with its tip pressed against the back of the teeth, and the lips relaxed adjacent the teeth and wherein said embouchure function symbol comprises at least one of:

a lip trumpet, instructing deviation from the embouchure mechanics of the home position by pursing or constricting the position of the lips;

an L function, instructing deviation from the embouchure mechanics of the home position by bowing the tongue upwards from the bottom of the mouth to place the tip of the tongue against the back of the upper teeth, from which position the tip of the tongue may be released to execute a sound corresponding to the L function;

a K function, instructing deviation from the embouchure mechanics of the home position by raising the blade of the tongue upwards from the bottom of the mouth to create a rounded peak in the middle of the mouth, with the tongue sloping downward both towards the teeth and towards the rear of the mouth, from which position the tongue may be released to a flat position to execute a sound corresponding to the K function; and a G function, instructing deviation from the embouchure mechanics of the home position by raising the back of the tongue into contact with the back of the hard palate to create a rounded peak in the back of the mouth, with the tongue sloping downward both towards the lower front teeth and more steeply downward behind the back of the tongue towards the throat, wherein the back of the tongue may be released into a flat position to execute a sound corresponding to the G function.

3. The teaching aid of claim 1, wherein said sound indicia marked on said substrate comprise lyrics to said vocal and a staff above said lyrics comprising a plurality of lines on which notes are placed indicating in metered time the rhythm and duration of the sounds of said lyrics, and wherein said embouchure function symbols are placed on said staff relative to said notes to instruct movement in metered time of at least one of the tongue, lips, jaw, and musculature of the mouth for singing said sounds in accordance with said notes.

4. The teaching aid of claim 1, wherein said substrate is a background image on a graphical user interface, and wherein said sound indicia, said home position symbol, and said embouchure function symbols are indicated by graphics displayed on said graphical user interface.

5. The teaching aid of claim 2, wherein said lip trumpet is selected from the group consisting of a < OH function, instructing deviation from the embouchure mechanics of the home position by pursing the lips in an open position; an < UH function, instructing deviation from the embouchure mechanics of the home position by constricting and pursing the lips while maintaining a substantially oval mouth opening;

and an oo function, instructing deviation from the embouchure mechanics of the home position by constricting and pursing the lips more forward to create a substantially round o-shaped mouth opening.

6. The teaching aid of claim 2, wherein said embouchure function symbol further comprises an NG function, instructing deviation from the embouchure mechanics of the home position by raising the back of the tongue into contact with the back of the hard palate to create a rounded peak in the back of the mouth, with the tongue sloping downward both towards the lower front teeth and more steeply downward behind the back of the tongue towards the throat, to execute a sound corresponding to the NG function.

7. The teaching aid of claim 2, wherein said embouchure function symbols further comprise symbols for tongue vowels selected from the group consisting of: EE, IH, EH, and AH.

8. The teaching aid of claim 2, wherein said embouchure function symbols further comprise symbols for rules selected from the group consisting of: a combination of embouchure function symbols selected from group consisting of the lip trumpet, the L function, the K function, or the G function; MPB; VF; S; Z; and < UH R+.

9. The teaching aid of claim 1, wherein said embouchure function symbols are marked on said substrate in a color corresponding to the embouchure mechanics represented by said symbol.

10. A system of notation of embouchure function symbols for representing the embouchure mechanics of the tongue, lips, jaw, and musculature of the mouth for singing a vocal in a musical work corresponding to the sounds associated with an alphabet, said embouchure function symbols comprising:

a home position symbol defining to a starting position from which the other embouchure functions are executed and in which breaths are taken, the embouchure mechanics of said starting position comprising the jaw being opened and fixed with the teeth a predetermined width apart, the tongue flat across the bottom of the mouth with its tip pressed against the back of the teeth, and the lips relaxed adjacent the teeth;

a lip trumpet function symbol corresponding to the embouchure mechanics for singing sounds associated with the letters O, U, and W, said lip trumpet function symbol representing deviation from the embouchure mechanics of the home position by pursing or constricting the position of the lips;

an L function symbol corresponding to the embouchure mechanics for singing sounds associated with the letters D, L, N, and T, said L function symbol representing deviation from the embouchure mechanics of the home position by bowing the tongue upwards from the bottom of the mouth to place the tip of the tongue against the back of the upper teeth, from which position the tip of the tongue may be released to execute said sounds associated with the L function;

a K function symbol corresponding to the embouchure mechanics for singing sounds associated with the letters C, K, said K function symbol representing deviation from the embouchure mechanics of the home position by raising the blade of the tongue upwards from the bottom of the mouth to create a rounded peak in the middle of the mouth, with the tongue sloping downward both towards the teeth and towards the rear of the mouth, from which position the tongue may be released to a flat position to execute said sounds corresponding to the K function; and a G function symbol corresponding to the embouchure mechanics for singing sounds associated with the letter G, said G function symbol instructing deviation from the embouchure mechanics of the home position by raising the back of the tongue into contact with the back of the hard palate to create a rounded peak in the back of the mouth, with the tongue sloping downward both towards the lower front teeth and more steeply downward behind the back of the tongue towards the throat, wherein the back of the tongue may be released into a flat position to execute said sound corresponding to the G function, wherein said system is displayed upon a substrate to create a relationship between the sounds of said vocal and the embouchure mechanics for singing said sounds.

11. The teaching aid of claim 10, wherein said lip trumpet is selected from the group consisting of a < OH function corresponding to the sound of the letter O, representing deviation from the embouchure mechanics of the home position by pursing the lips in an open position; an < UH function corresponding to the sounds of the letter U, representing deviation from the embouchure mechanics of the home position by constricting and pursing the lips while maintaining a substantially oval mouth opening; and an oo function corresponding to the letters U and W, instructing deviation from the embouchure mechanics of the home position by constricting and pursing the lips more forward to create a substantially round o-shaped mouth opening.

12. The system of notation of claim 11, wherein said embouchure function symbols further comprises an NG function corresponding to the sound of the letters NG, representing deviation from the embouchure mechanics of the home position by raising the back the tongue into contact with the back of the hard palate to create a rounded peak in the back of the mouth, with the tongue sloping downward both towards the lower front teeth and more steeply downward behind the back of the tongue towards the throat, to execute said sound corresponding to the NG function.

13. The system of notation of claim 11, wherein said embouchure function symbols further comprise symbols for tongue vowels selected from the group consisting of: EE, IH, EH, and AH.

14. The system of notation aid of claim 11, wherein said embouchure function symbols further comprise the following embouchure function symbols for rules:
 a symbol combining of the lip trumpet < UH and the L function for the sound corresponding to the letter J;
 an MPB symbol corresponding to the sounds associated with the letters M, P, and B, said MPB symbol representing deviating from the home position by closing the lips together to execute the M, P, or B sound and immediately opening the lips to resume the home position;
 a VF symbol corresponding to the sounds associated with the letters V and F, said VF symbol representing deviating from the home position by moving the lower lip to the upper teeth to execute the V of F sound and immediately opening the lower lip to resume the home position.

15. The system of notation of claim 10, wherein said embouchure function symbols are color coded.

16. The system of notation of claim 10, further comprising a staff comprising a plurality of lines on which notes are placed indicating in metered time the rhythm and duration of the sounds of the vocal of said work, and wherein said embouchure function symbols are placed on said staff relative to said notes to instruct movement in metered time of at least one of the tongue, lips, jaw, and musculature of the mouth for singing said sounds in accordance with said notes.

\* \* \* \* \*